United States Patent
Mukkara et al.

(10) Patent No.: US 12,314,156 B2
(45) Date of Patent: May 27, 2025

(54) AUTOMATED CREATION OF RESILIENCY EXPERIMENTS

(71) Applicant: Harness Inc., San Francisco, CA (US)

(72) Inventors: Umasankar Mukkara, Bengaluru (IN); Karthik Satchitanand, Bengaluru (IN); Harish Doddala, San Francisco, CA (US)

(73) Assignee: Harness Inc., San Francisco, CA (US)

( * ) Notice: Subject to any disclaimer, the term of this patent is extended or adjusted under 35 U.S.C. 154(b) by 43 days.

(21) Appl. No.: 18/239,987

(22) Filed: Aug. 30, 2023

(65) Prior Publication Data
US 2025/0077394 A1 Mar. 6, 2025

(51) Int. Cl.
G06F 11/00 (2006.01)
G06F 11/3668 (2025.01)
G06F 11/3698 (2025.01)

(52) U.S. Cl.
CPC ...... *G06F 11/3684* (2013.01); *G06F 11/3688* (2013.01); *G06F 11/3698* (2025.01)

(58) Field of Classification Search
CPC ...... G06F 11/26; G06F 11/261; G06F 11/263; G06F 11/3664; G06F 11/3684; G06F 11/3688
See application file for complete search history.

(56) References Cited

U.S. PATENT DOCUMENTS 10,986,013 B1 * 4/2021 Theimer .............. G06F 11/3466
11,847,046 B1 * 12/2023 Ayyadurai .......... G06F 11/3684
2016/0371134 A1 * 12/2016 Raghavendra ........ G06F 11/079
2020/0366573 A1 * 11/2020 White ................. G06F 9/45558
2022/0224625 A1 * 7/2022 Anderson ........... G06F 11/3006
2023/0135825 A1 * 5/2023 Surisetty ............. G06F 11/3051
714/47.2

OTHER PUBLICATIONS

Long, Zhenyue et al., Fitness-guided Resilience Testing of Microservice-based Applications, 2020, IEEE (Year: 2020).*
Frank, Sebastian et al., MiSim: A Simulator for Resilience Assessment of Microservice-Based Architectures, 2022, IEEE (Year: 2022).*
Elsaadawy, Mona et al., Dynamice Application Call Graph Formation and Service Identification in Cloud Data Centers, 2022, IEEE (Year: 2022).*
Karn, Rupesh Raj et al., Automated Testing and Resilience of Microservice's Network-link using Istio Service Mesh, 2022 (Year: 2022).*

* cited by examiner

*Primary Examiner* — Marc Duncan
(74) *Attorney, Agent, or Firm* — Bachmann Law Group PC

(57) ABSTRACT

A system automatically generates resiliency tests to detect the resiliency of an application implemented over multiple machines. In operation, one or more services operating on a plurality of machines is automatically identified. Fault targets are then automatically created based on the identified one or more services. The generation of the fault targets may be based on the identified services, user input, or past performance of the plurality of machines. Experiments may then be conducted, based on the created targets, on the one or more services. The experiments may insert faults into resources associated with the services. The resources may include CPU resources, memory, networking resources, and APIs. A resiliency score may be generated based on the experiments.

19 Claims, 9 Drawing Sheets

AUTOMATED CREATION OF RESILIENCY EXPERIMENTS

BACKGROUND

Software applications have evolved and are implemented in a variety of platforms. One thing that has remained constant though, is the need for reliability. Testing an application for reliability during production is very important, as customers expect applications to run smoothly. Usually, software application architecture or deployment is tested to determine if it is stable. The stability tests are typically done manually and require much oversight and time by engineers who implement them. These manually created stability tests may not catch each and every weak link in a system, and require considerable engineer time and bandwidth to implement. What is needed is an improved way of testing the reliability of an application.

SUMMARY

The present technology, roughly described, automatically generates resiliency tests to detect the resiliency of an application implemented over multiple machines. In operation, one or more services operating on a plurality of machines is automatically identified. Fault targets are then automatically created based on the identified one or more services. The generation of the fault targets may be based on the identified services, user input, or past performance of the plurality of machines. Experiments may then be conducted, based on the created targets, on the one or more services. The experiments may insert faults into resources associated with the services. The resources may include CPU resources, memory, networking resources, and APIs. A resiliency score may be generated based on the experiments.

In some instances, the present technology performs a method for automatically generating resiliency tests. The method begins with automatically identifying one or more services operating on a plurality of machines. Fault targets are then automatically created based on the identified one or more services. Conducting experiments are automatically created on the one or more services using the created fault targets. A resilience score is then generated based on the experiments.

In some instances, the present technology includes a non-transitory computer readable storage medium having embodied thereon a program, the program being executable by a processor to automatically generating resiliency tests. The method begins with automatically identifying one or more services operating on a plurality of machines. Fault targets are then automatically created based on the identified one or more services. Conducting experiments are automatically created on the one or more services using the created fault targets. A resilience score is then generated based on the experiments.

In some instances, the present technology includes a system having one or more servers, each including memory and a processor. One or more modules are stored in the memory and executed by one or more of the processors to automatically identifying one or more services operating on a plurality of machines, automatically creating fault targets based on the identified one or more services, automatically conducting experiments on the one or more services using the created fault targets, and generating a resilience score based on the experiments.

DETAILED DESCRIPTION

The present technology, roughly described, automatically generates resiliency tests to detect the resiliency of an application implemented over multiple machines. In operation, one or more services operating on a plurality of machines is automatically identified. Fault targets are then automatically created based on the identified one or more services. The generation of the fault targets may be based on the identified services, user input, or past performance of the plurality of machines. Experiments may then be conducted, based on the created targets, on the one or more services. The experiments may insert faults into resources associated with the services. The resources may include CPU resources, memory, networking resources, and APIs. A resiliency score may be generated based on the experiments.

Identifying one or more services may include installing agents at each of a plurality of machines. The agents may intercept traffic and identify the services at each machine. In some instances, an agent may collect traffic data and transmit the data back to an application, which may then identify the plurality of machines based on the captured data. Once the services are identified, one or more resources, network connections, APIs, and/or other entity may be identified as a fault target.

In some instances, the experiments may include chaos experiments that are performed for microservice-based applications with complex topologies. In some instances, the chaos experiments induce controlled failures into a distributed application to gain confidence in the application behavior. The experiments are automatically created based on an automatically discovered network map of an application, service, cluster, or logical group of interacting services.

Experiments may be generated to test the resiliency of one or more machines in a system. Running experiments may include creating a fault for each resource and network connection identified for each of the one or more services. In some instances, a user may provide input regarding which faults to insert or focus on, or which services are more important. The experiments may include two faults each, selected from the faults identified by the user. In some instances, historic operating data for one or more machines may be accessed, performance issues may be identified, and three or more faults may be selected to be inserted into machines based on the performance issues identified in the historic operating data.

Figure 1:
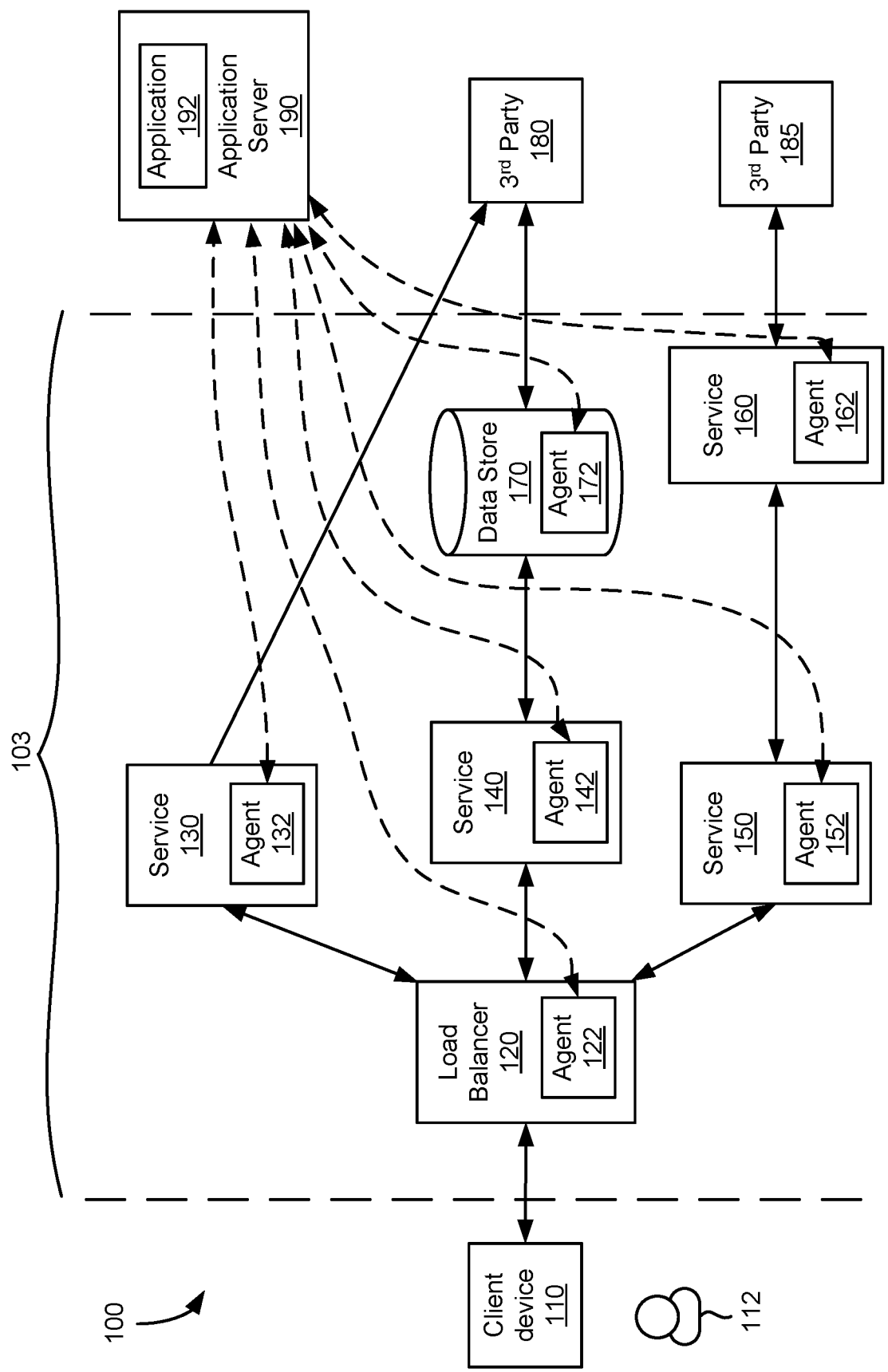
FIG. 1 is a block diagram of a system for automatically generating resiliency tests.

FIG. 1 is a block diagram of a system for automatically generating resiliency tests. The diagram of FIG. 1 includes client device 110, load balancer 120, services 130, 140, 150, and 160, data store 170, third party servers 180 and 185, and application server 190. In operation, a user 112 may request a service from system 103 through client device 110. The user's request may initially be received by load balancer 120, which may then distribute one or more requests to services 130-150. Each of services 130-150 may process the request, and prepare a response to be sent back to load balancer 120, which is then forwarded to client device 110.

In processing the request, each of services 130-150 may submit requests to other machines in system 103 or outside system 103, such as data store 170, service 160, or third-party servers 180 or 185. Each of these additional machines may process the request, return the request to the requesting service, one of services 130-150, and services 130-150 may then prepare a response to be sent to client device 110.

Data store 170 may store, manage, edit, and delete data. Data store 170 may be accessed by any of services 130-160 (not all lines of communication are illustrated in FIG. 1). In some instances, data store 170 may be implemented as more than one data store, within system 103 and exterior to system 103.

Each machine in system 103 may include an agent. As illustrated, load balancer 120 includes agent 122, services 130-160 include agents 132-162, respectively, and data store 170 includes agent 172. Each agent may intercept traffic, including requests sent to the machine or responses sent by the machine, parse traffic, insert faults, and perform resilience detection. In some instances, the agents are installed by a monitoring entity on top of a system provided and managed by a different entity. Each agent may be in communication with application server 190. Agents are discussed in more detail with respect to FIG. 2

Application server 190 may be in communication with each of agents 122-172, and may include one or more applications 192. Application 190 and application 192 may be implemented in a system outside platform 103 (as illustrated in FIG. 1) or within platform 103 (not illustrated). Application 192 may parse traffic received from one or more agents, generate fault targets, manage a resiliency state machine, create and manage experiments, and create and manage templates for generating experiments. Application 192 is discussed in more detail with respect to FIG. 3.

In some instances, machines 120-170 may be implemented within a single system, and may communicate with client device 110, application server 190, and third parties 180-185 over one or more networks. The networks may include private networks, public networks, a LAN, a WAN, the Internet, an intranet, a wireless network, a Wi-Fi network, a cellular network, a fiber-optic network, a combination of these networks, or some other network that is capable of communicating data. In some instance, one or more of these networks may be implemented within system 103, as well as between system 103 and the machines illustrated outside the system in FIG. 1.

Load balancer 120, services 130-160, and data store 170 may comprise a network-based service 103 provided to external clients such as client device 110. The network-based service 103 may include a plurality of micro-services (e.g., services 130-160) to process requests, and may also communicate with third party servers 180-185. The network service 103 may be implemented in one or more cloud-based service providers, such as for example AWS by Amazon Inc, AZURE by Microsoft, GCP by Google, Inc., Kubernetes, or some other cloud based service provider.

Each microservice may be implemented as a collection of software that implements a particular function or service. A microservice can be implemented in, for example, a virtual machine or a container, cluster, node, and as one or more processes. The microservices can be implemented on a separate server, or some microservices can be implemented on the same server. A microservice may include one or more APIs to which requests may be sent and from which responses may be transmitted. Each of micro-services 130-160 may implement a particular task or function, such as an e-commerce order service, reservation service, delivery service, menu service, payment service, notification service, or some other service that may be implemented over network.

Figure 2:
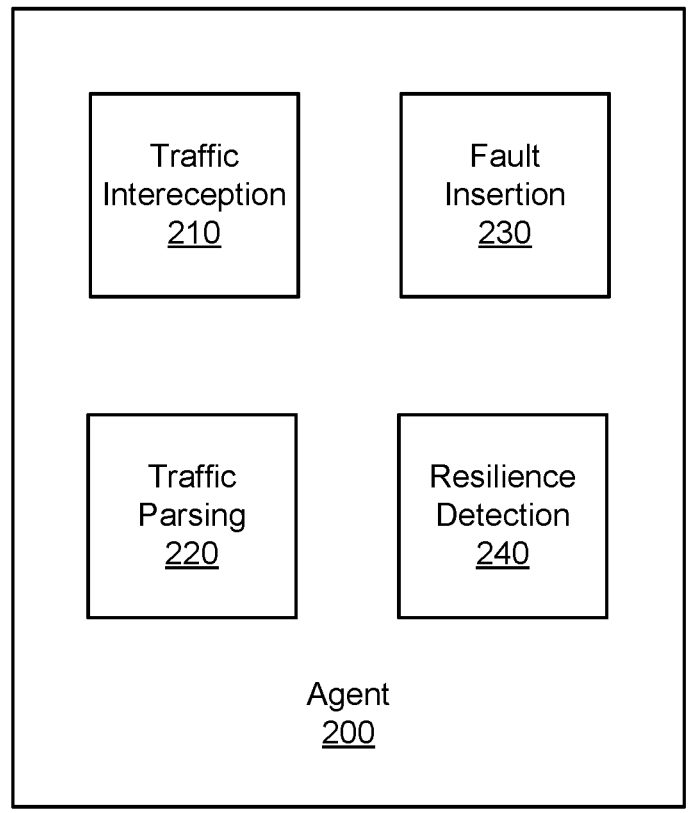
FIG. 2 is a block diagram of an agent.

FIG. 2 is a block diagram of an agent. Agent 200 of FIG. 2 provides more detail for each agent 132-172 of the system of FIG. 1. The block diagram of FIG. 2 includes traffic interception module 210, traffic parsing module 220, fault insertion module 230, and resilience detection module 240.

Traffic interception module 210 may intercept traffic on the machine at which the agent is installed. The traffic may include requests and responses, and may be stored locally at the agent or transmitted back to application 192. Traffic parsing module 220 may parse the traffic that is intercepted by interception module 210. Parsing traffic may include identifying services named in a request or response, identifying datatypes, identifying destinations, identifying sources of the traffic, and identifying other parts of the traffic.

Fault insertion module 230 may insert one or more faults at each service. For each service, a number of resources, network connections, and API requests may be identified. Fault insertion module 230 may insert a fault at each of the identified resources, network connections, and APIs.

Resilience detection module 240 may monitor performance of resources, network connections, and APIs, and determine a resiliency score for each resource, network connection, API, service or machine, and the system as a whole. In some instances, resilience detection module 240 may access the intercepted traffic and determine performance metrics for the resources, network connections, APIs, and services as a whole based on experiments that have been applied. The resiliency score may be determined based on the performance metrics and/or other data.

Figure 3:
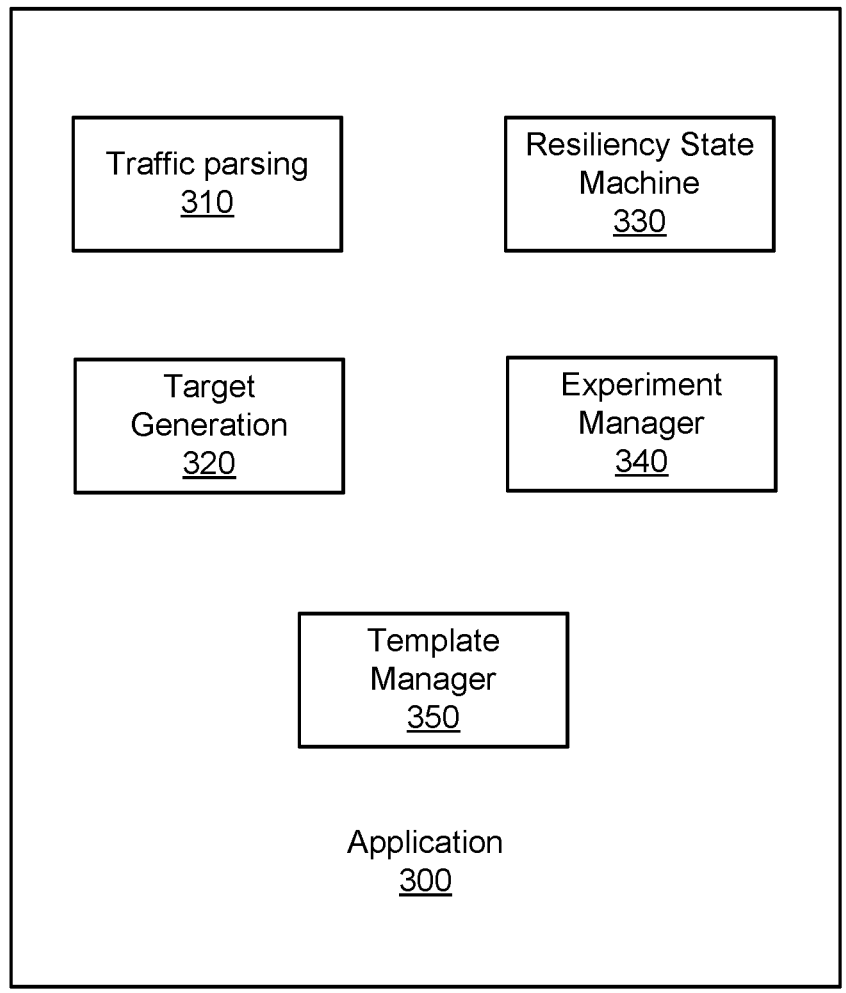
FIG. 3 is a block diagram of an application.

FIG. 3 is a block diagram of an application. The block diagram of FIG. 3 provides more detail for application 192 of FIG. 1. Application 300 includes traffic parsing module 310, target generation module 320, resiliency state machine 330, experiment manager 340, and template manager 350.

Traffic parsing module 310 may parse the traffic that is intercepted by agents and provided to the application. Parsing the traffic may include identifying services named in a request or response, identifying datatypes, identifying destinations, identifying sources of the traffic, and identifying other parts of the traffic.

Target generation module 320 may generate targets from which experiments are generated. In some instances, the targets are generated based on resources, network connections, and APIs detected for each of the services detected in a system. In some instances, targets are generated based on the detected resources, network connections, and APIs and further based on user input regarding which services are more important, which should not be tested for resiliency, and other user input. In some instances, targets are generated based on historical performance, in particular which services, resources, network connections, and APIs had service issues in the past.

Resiliency state machine 330 determines a resiliency state for system 103, and updates the resiliency score based on experiments performed on the system. As resources, network connections, and APIs fail to operate as expected, systems fail to operate as expected, or the system as a whole fails to operate as expected. In response to one or more faults being injected, resiliency state machine updates the resiliency score of the system, service, or other portion accordingly.

Payment manager 340 creates, executes, and manages experiments. There may be several types of experiments applied to fault targets. A first level experiment may be generated for each and every resource, network connection, and API discovered a system. In some instances, a second level experiment may be generated with two or more faults for resources, network connections, and APIs that are selected by a user, directly or indirectly. In some instances, a third level experiment may be generated with three or more faults to be inserted. The third level experiment may be based on past historical performance, and can be created from templates.

Template manager 350 may be used to generate templates from which experiments may be generated. In some instances, the templates may be accessed by experiment manager 340, from which third level experiments are generated. As such, the templates may have three or more faults inserted into targets in situations related to historical performance that had an issue or otherwise did not meet expectations.

Figure 4:
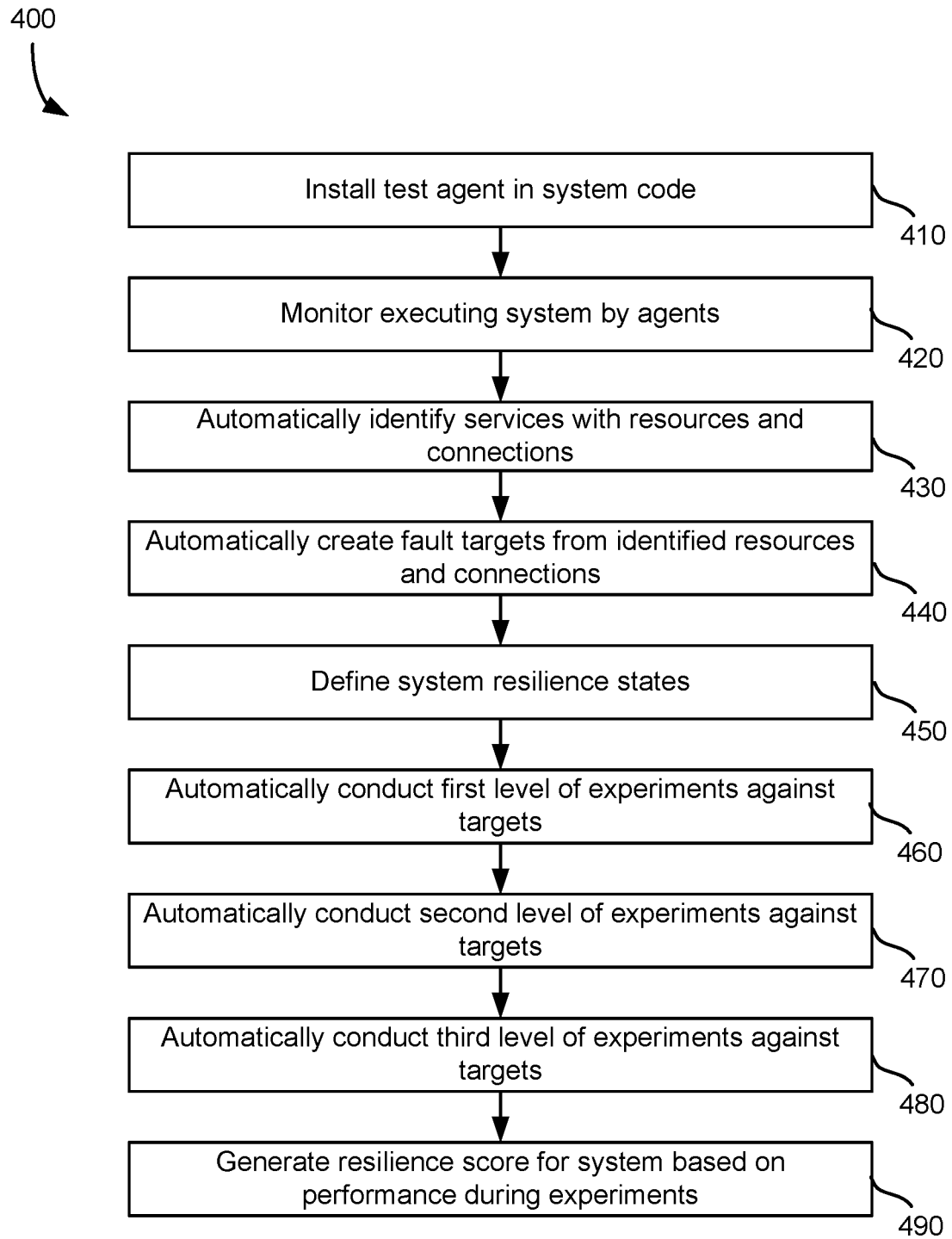
FIG. 4 is a method for automatically generating resiliency tests.

FIG. 4 is a method for automatically generating resiliency tests. First, tests agents may be installed in a system at step 410. In some instances, one agent is installed within each machine, whether physical or virtual, or each node within a system. The system is monitored by the installed agents at step 420. Monitoring may include intercepting traffic received and transmitted by each machine or node, and parsing the intercepted traffic.

Services having resources and network connections are automatically identified at step 430. The services may include physical machines, virtual machines, nodes, or other entities that process data as part of a system that performs a task. The automatically identified services may also have APIs in addition to resources and network connections. They may be identified automatically by parsing the intercepted traffic and extracting data related to the identity of the services, resources, and network connections.

Fault targets are automatically created at step 440. The fault targets are automatically created from the identified resources and connections at step 440. In some instances, each resource, network connection, and API may be identified as a target. However, experiments generated to test resiliency of the system may not insert faults into each and every target.

A system resilience state is defined at step 450. Defining a system resilience state includes defining a normal resilience, resilience state of concern, and a failed resilience state. Each state may be associated with a range of values for a resilience score.

A first level of experiments is automatically applied against targets at step 460. Applying the first level experiments may include creating a first level experiment per fault and executing the created experiments. Automatically conducting first level of experiments against targets is discussed with respect to the method of FIG. 5.

A second level of experiments is automatically conducted against targets at step 470. Automatically conducting a second level experience may include generating experiments with two or more faults and allowing a user to select which faults should be included. Automatically conducting a second level of experiments against targets is discussed in more detail with respect to the method of FIG. 6.

A third level of experiments is automatically conducted against targets at step 480. Conducting a third level experiments may include selecting faults to populate one or more templates to be applied to services having resources, network connections, and APIs. Automatically conducting a third level of experiments against targets is discussed with respect to the method of FIG. 8.

A resilience score for a system is generated based on the performance during the experiments at step 490. Generating the resilience score may include generating metrics for each service, resource, network connection, and API, monitoring their performance after an experiment has been applied, and updating a resilience score accordingly.

In some instances, in addition to automatically performing experiments, the present system may automatically recommend experiments for running after creation. The experiments may be automatically recommended as more information is gathered for one or more services. In some instances, after one or more experiments are created, the present system can recommend experiments based on criticality of service (e.g., more traffic being observed). The service criticality can be determined if a threshold level of traffic is experienced by a particular service, such as for example a traffic level in the top 30%, 20%, 10%, or other percentage of all services. In some instances, after one or more experiments are created, the present system can recommend experiments based on how many other services are connected to a particular service (e.g., there is more dependency on surrounding services). The service dependability can be determined if a threshold level of connections are made to a particular service, such as for example 2, 3, 4, 5, or more connections.

Figure 5:
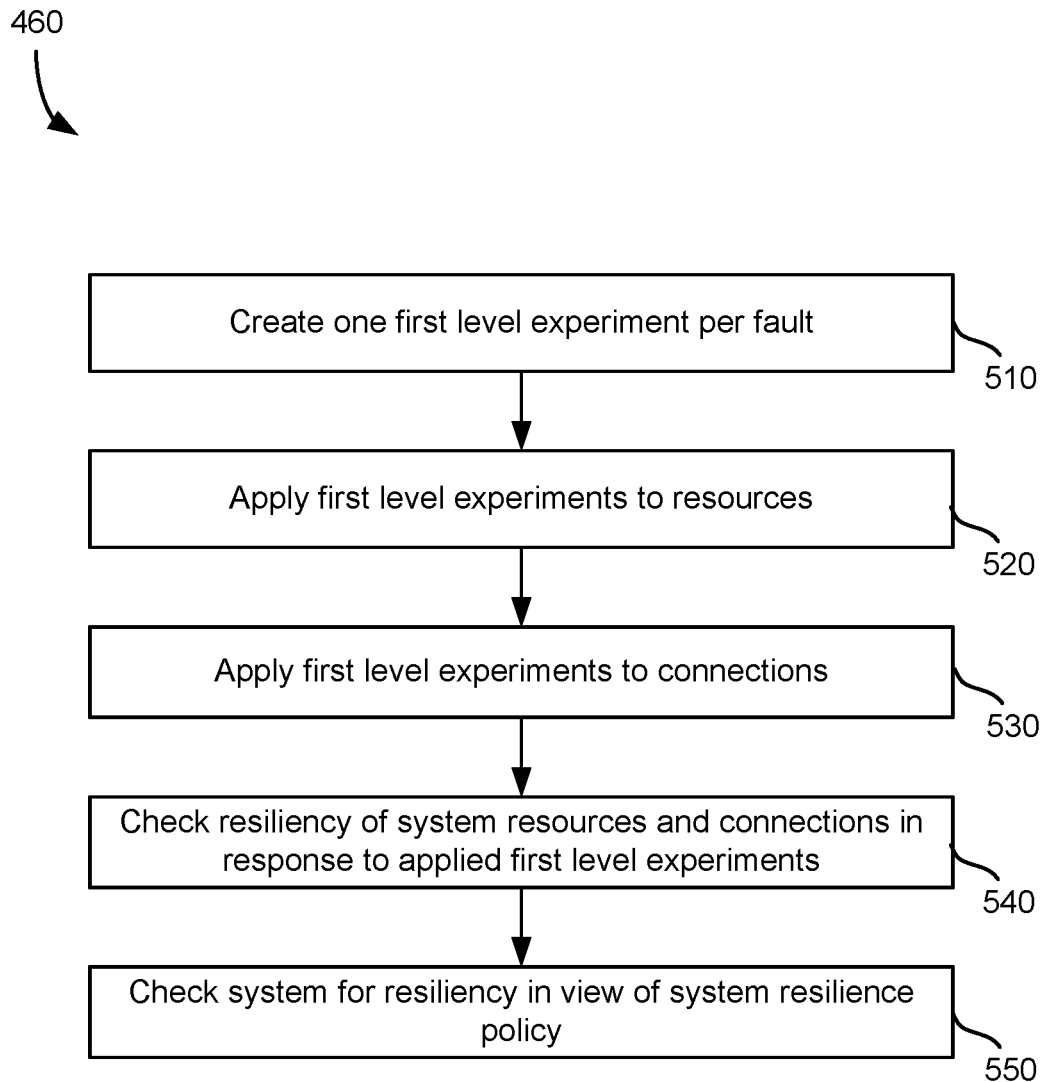
FIG. 5 is a method for automatically conducting first level experiments against targets.

FIG. 5 is a method for automatically conducting first level experiments against targets. The method of FIG. 5 provides more detail for step 460 of the method of FIG. 4. One first level experiment is created for each fault at step 510. Hence, for every fault, there will be an experiment, and every experiment will contain exactly one fault. The first level experiments are applied to the resources at step 520. The experiments may be applied to resources such as CPUs, memory, and other hardware resources. First level experiments are applied to network connections at step 530. The network connections may include ports and other connection units. In some instances, first level experience may be applied to other aspects of the system, such as APIs.

The resiliency of system resources, network connections, and other service units are checked in response to the applied first level experiments at step 540. The resiliency can be checked by generating metrics from intercepted traffic that involve the resources, connections, and so forth. For example, after a first level experiment, and may be determined that memory is running slow for a particular service. The entire system is checked for reliability in view of the system resilience policy at step 550. In addition to the service that includes the resources and connections that the fault was applied to, the entire system may also be checked to determine if there are resiliency effects that trickle away from the particular service at which the experiment was applied.

Figure 6:
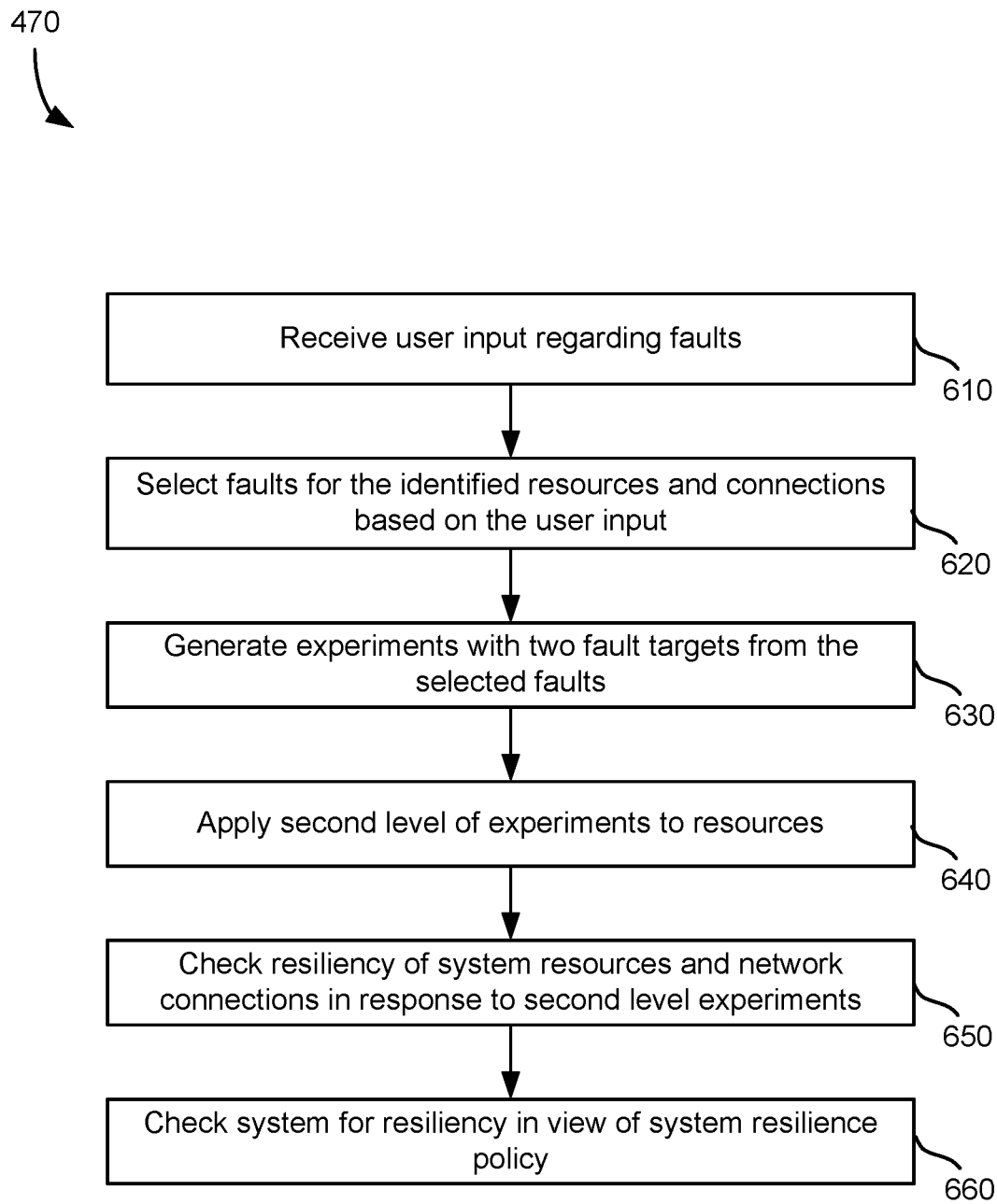
FIG. 6 is a method for automatically conducting second level experiments against targets.

FIG. 6 is a method for automatically conducting second level experiments against targets. The method of FIG. 6 provides more detail for step 470 of the method of FIG. 4. User input is received regarding faults at step 610. The user input may identify which faults should be applied to service resources and network connections. More detail for receiving user input regarding faults is discussed with respect to the method of FIG. 7.

Faults are selected for the identified resources and network connections based on the user input at step 620. In some instances, the user input may identify categories of resources, network connections, APIs, or other units for which faults should be generated. Experiments may be generated with two fault targets from the selected faults at step 630. In some instances, the selected faults are those selected based on the received user input.

The second level experiments may be applied to resources, network connections, and APIs at step 640. The resiliency of the system resources and network connections is then checked in response to the applied second level experiments at step 650. The system as a whole is then checked for resiliency in view of the system resiliency policy at step 660.

Figure 7:
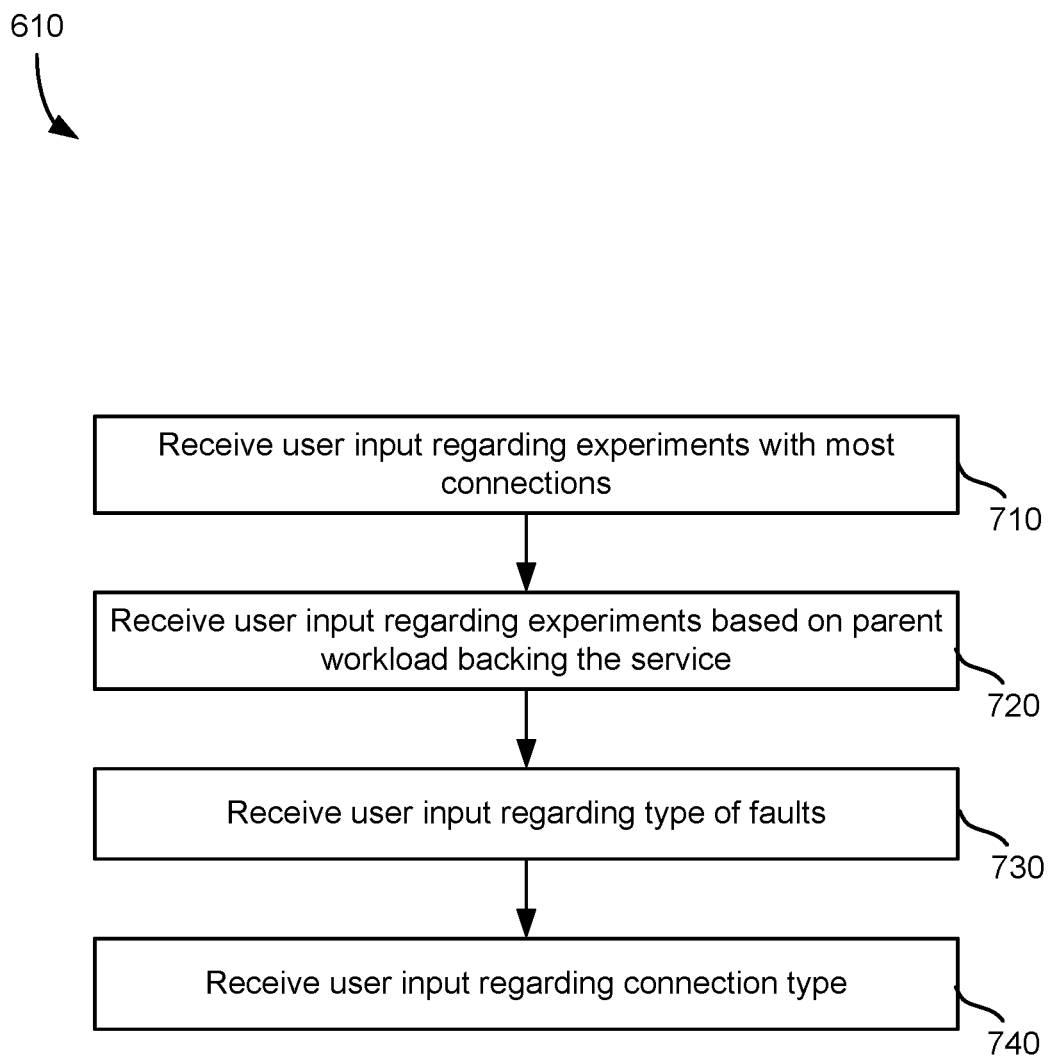
FIG. 7 is a method for receiving user input regarding faults.

FIG. 7 is a method for receiving user input regarding faults. The method of FIG. 7 provides more detail for step 610 of the method of FIG. 6. User input is received regarding experiments with the most connections at step 710. The experiments with the most connections may cover the most ground, or the widest blast area for network connections to test for resiliency.

User input regarding experiments based on the parent workload backing the service is received at step 720. This input may select services that are the busiest and experience the highest level of traffic. User input is received regarding the type of fault at step 730. Types of faults may include functional areas, syntax errors, logic errors, calculation errors, unit level bugs, system level integration bugs, out of bound bugs, and other faults.

User input may be received regarding the connection type at step 740. Different types of connection may include hardwired ports, and 10 I connections, cable connections, and other connections capable of transmitting data.

Figure 8:
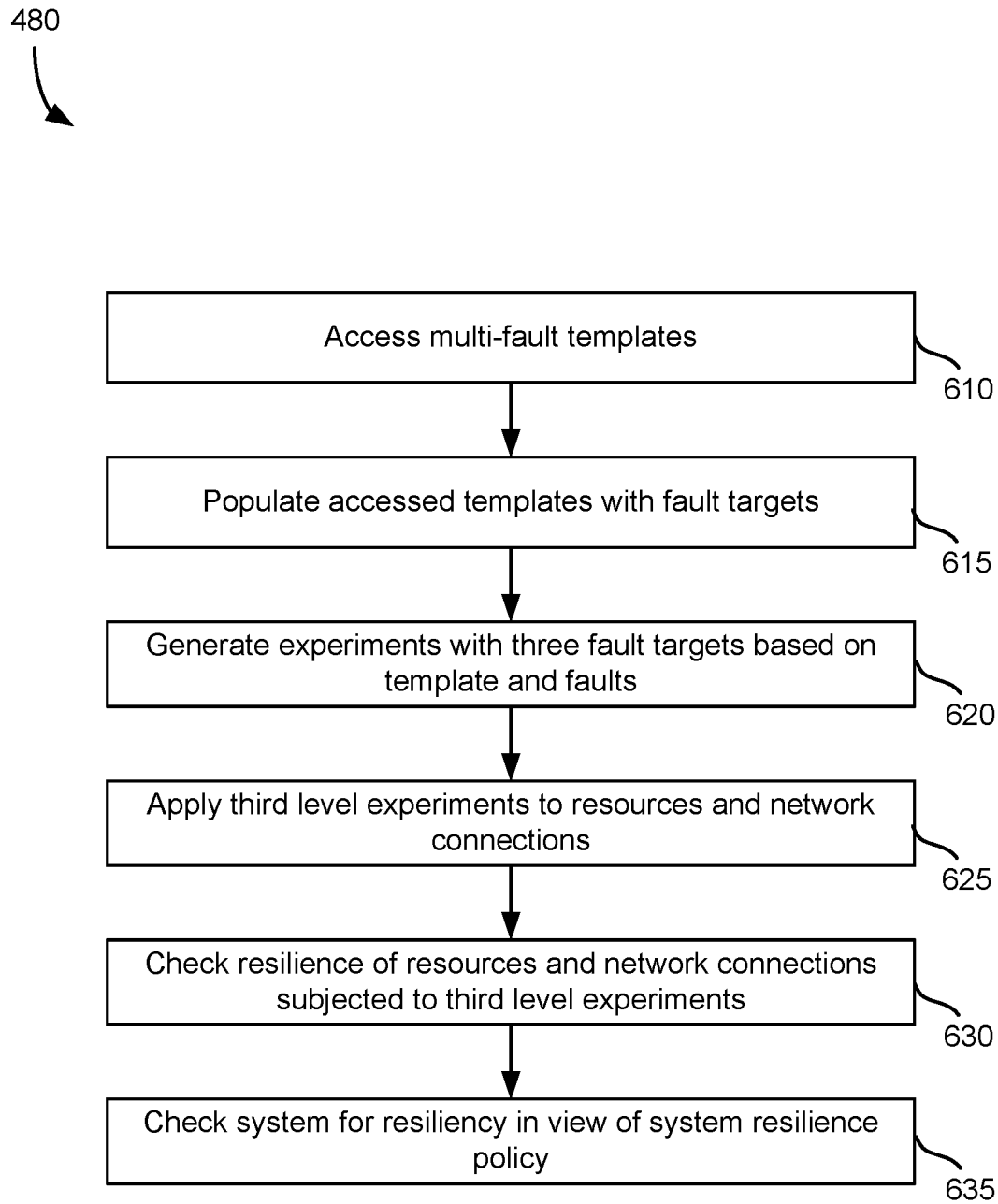
FIG. 8 is a method for automatically conducting third level experiments against targets.

FIG. 8 is a method for automatically conducting third level experiments against targets. The method of FIG. 8 provides more detail for step 480 of the method of FIG. 4. First, multi-fault templates are accessed at step 610. The multi-fault templates may be generated based on historical performance for one or more resources. The accessed templates are then populated with fault targets at step 615. In some instances, each template may be populated with three or more targets associated with faults. Experiments are then generated with three fault targets based on the templates and faults at step 620. The third level experiments generated from the templates and have three faults each are then applied to the system at step 625. In some instances, the third level experiments are applied to resources, network connections, and APIs.

The resilience of the resources and network connections is then checked at step 630. The resilience of the resources and network connections subjected to the third level experiments are checked to see if their performance is affected by application of the experiment. Once the resources and network connection resiliency has been checked, a check is on systemwide for resiliency in view of the system resilience policy and the applied third level experiment at step 635.

Figure 9:
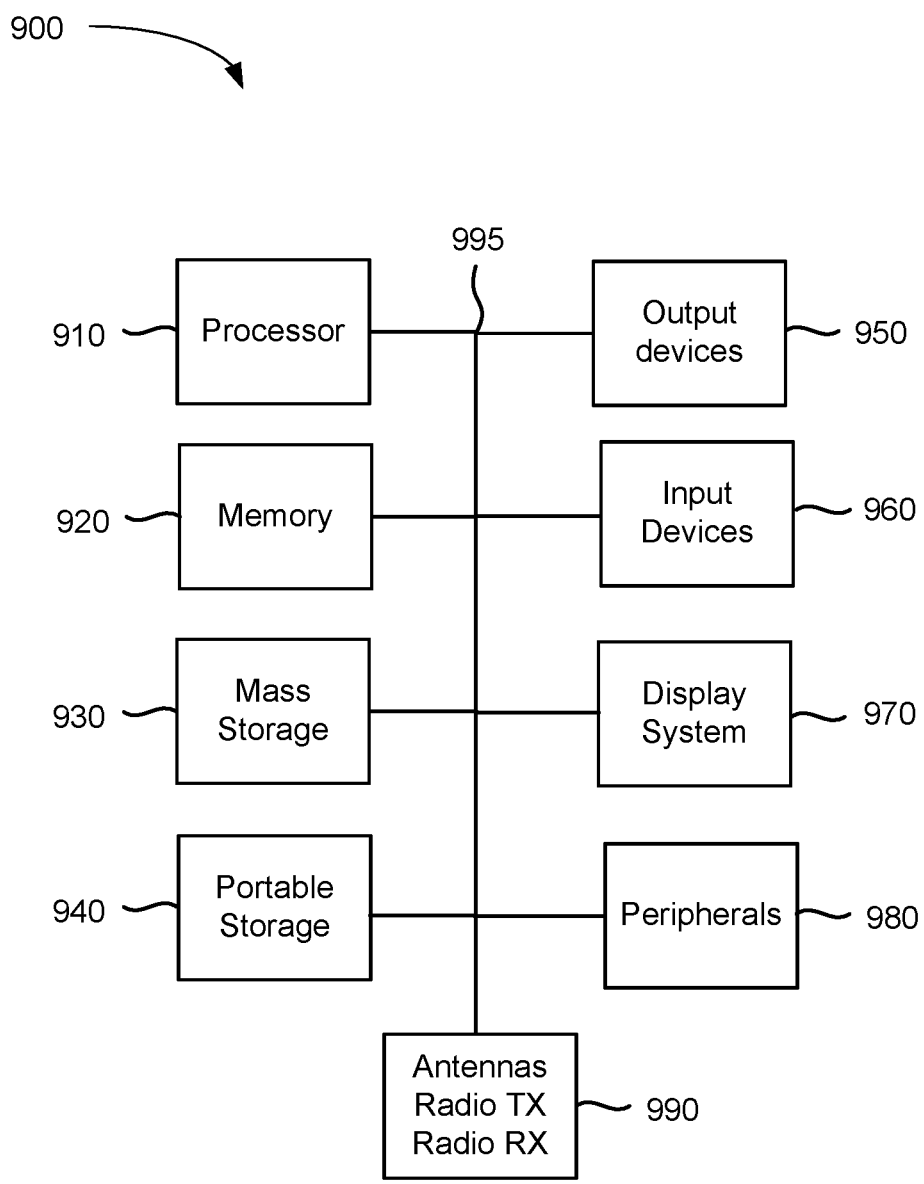
FIG. 9 is a block diagram of a computing environment for implementing the present technology.

FIG. 9 is a block diagram of a computing environment for implementing the present technology. System 900 of FIG. 9 may be implemented in the contexts of the likes of machines that implement client device 110, load balancer 120, microservices 130-160, data store 170, third party servers 180-185, and application server 190. The computing system 900 of FIG. 9 includes one or more processors 910 and memory 920. Main memory 920 stores, in part, instructions and data for execution by processor 910. Main memory 920 can store the executable code when in operation. The system 900 of FIG. 9 further includes a mass storage device 930, portable storage medium drive(s) 940, output devices 950, user input devices 960, a graphics display 970, and peripheral devices 980.

The components shown in FIG. 9 are depicted as being connected via a single bus 995. However, the components may be connected through one or more data transport means. For example, processor unit 910 and main memory 920 may be connected via a local microprocessor bus, and the mass storage device 930, peripheral device(s) 980, portable storage device 940, and display system 970 may be connected via one or more input/output (I/O) buses.

Mass storage device 930, which may be implemented with a magnetic disk drive, an optical disk drive, a flash drive, or other device, is a non-volatile storage device for storing data and instructions for use by processor unit 910. Mass storage device 930 can store the system software for implementing embodiments of the present invention for purposes of loading that software into main memory 920.

Portable storage device 940 operates in conjunction with a portable non-volatile storage medium, such as a floppy disk, compact disk or Digital video disc, USB drive, memory card or stick, or other portable or removable memory, to input and output data and code to and from the computer system 900 of FIG. 9. The system software for implementing embodiments of the present invention may be stored on such a portable medium and input to the computer system 900 via the portable storage device 940.

Input devices 960 provide a portion of a user interface. Input devices 960 may include an alpha-numeric keypad, such as a keyboard, for inputting alpha-numeric and other information, a pointing device such as a mouse, a trackball, stylus, cursor direction keys, microphone, touch-screen, accelerometer, and other input devices. Additionally, the system 900 as shown in FIG. 9 includes output devices 950. Examples of suitable output devices include speakers, printers, network interfaces, and monitors.

Display system 970 may include a liquid crystal display (LCD) or other suitable display device. Display system 970 receives textual and graphical information and processes the information for output to the display device. Display system 970 may also receive input as a touch-screen.

Peripherals 980 may include any type of computer support device to add additional functionality to the computer system. For example, peripheral device(s) 980 may include a modem or a router, printer, and other device.

The system of 900 may also include, in some implementations, antennas, radio transmitters and radio receivers 990. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth device, and other radio frequency networks. The devices may include one or more radio transmitters and receivers for processing signals sent and received using the antennas.

The components contained in the computer system 900 of FIG. 9 are those typically found in computer systems that may be suitable for use with embodiments of the present invention and are intended to represent a broad category of such computer components that are well known in the art. Thus, the computer system 900 of FIG. 9 can be a personal computer, handheld computing device, smart phone, mobile computing device, tablet computer, workstation, server, minicomputer, mainframe computer, or any other computing device. The computer can also include different bus configurations, networked platforms, multi-processor platforms, etc. The computing device can be used to implement applications, virtual machines, computing nodes, and other computing units in different network computing platforms, including but not limited to AZURE by Microsoft Corporation, Google Cloud Platform (GCP) by Google Inc., AWS by Amazon Inc., IBM Cloud by IBM Inc., and other platforms, in different containers, virtual machines, and other software. Various operating systems can be used including UNIX, LINUX, WINDOWS, MACINTOSH OS, CHROME OS, IOS, ANDROID, as well as languages including Python, PHP, Java, Ruby, .NET, C, C++, Node.JS, SQL, and other suitable languages.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

The invention claimed is:

1. A method for automatically generating resiliency tests, comprising:
   automatically identifying one or more services operating on a plurality of machines, wherein identifying includes:
      installing agents at the plurality of the machines,
      intercepting, by each agent, traffic transmitted to each of the plurality of machines and from each of the one plurality of machines with respect to one or more resources,
      generating traffic data that includes one or more resources located remote from the plurality of machines and engaged in traffic with one or more of the plurality of machines,
      transmitting generated traffic data to an application by each agent, and
      identifying the one or more services by the application based on the traffic data received from the agents;
   automatically creating fault targets based on the identified one or more services;
   automatically conducting experiments on the one or more services using the created fault targets; and
   generating a resilience score based on the experiments.

2. The method of claim 1, wherein creating fault targets includes:
   identifying, for each identified service, one or more resources or network connections; and
   creating a fault for each resource and network connection.

3. The method of claim 1, wherein conducting experiments includes creating an experiment to insert a fault for one or more resources and one or more network connection associated with each of the one or more services.

4. The method of claim 1, wherein conducting experiments includes:
   identifying, for each identified service, one or more resources or network connections; and
   receiving input from a user regarding faults to insert in the one or more services; and
   creating an experiment based on the user input, wherein each experiment inserts two faults in one or more of the one or more services, the two faults selected based on the received user input.

5. The method of claim 4, wherein the user input includes one or more of connections, workload, fault type, and connection type.

6. The method of claim 1, wherein conducting experiments includes:
   identifying, for each identified service, one or more resources or network connections;
   retrieving a template that inserts a plurality of faults into a resource or network connection; and
   creating an experiment based on retrieve template, wherein each experiment inserts a plurality of faults in one or more of the one or more services, the plurality of faults selected based on a received user input.

7. The method of claim 1, further comprising automatically recommending one or more experiments for execution after creation.

8. The method of claim 7, wherein the one or more experiments are recommended based at least in part on traffic observed for a service of the one or more services or the number of services connected to the service of the one or more services.

9. A non-transitory computer readable storage medium having embodied thereon a program, the program being executable by a processor to perform a method for automatically generating resiliency tests, the method comprising:
   automatically identifying one or more services operating on a plurality of machines, wherein identifying includes:
      installing agents at the plurality of the machines,
      intercepting, by each agent, traffic transmitted to each of the plurality of machines and from each of the one plurality of machines with respect to one or more resources,
      generating traffic data that includes one or more resources located remote from the plurality of machines and engaged in traffic with one or more of the plurality of machines,
      transmitting generated traffic data to an application by each agent, and
      identifying the one or more services by the application based on the traffic data received from the agents;
   automatically creating fault targets based on the identified one or more services;
   automatically conducting experiments on the one or more services using the created fault targets; and
   generating a resilience score based on the experiments.

10. The non-transitory computer readable storage medium of claim 9, wherein creating fault targets includes:
    identifying, for each identified service, one or more resources or network connections; and
    creating a fault for each resource and network connection.

11. The non-transitory computer readable storage medium of claim 9, wherein conducting experiments includes creating an experiment to insert a fault for one or more resources and one or more network connection associated with each of the one or more services.

12. The non-transitory computer readable storage medium of claim 9, wherein conducting experiments includes:
    identifying, for each identified service, one or more resources or network connections; and
    receiving input from a user regarding faults to insert in the one or more services; and
    creating an experiment based on the user input, wherein each experiment inserts two faults in one or more of the one or more services, the two faults selected based on the received user input.

13. The non-transitory computer readable storage medium of claim 12, wherein the user input includes one or more of connections, workload, fault type, and connection type.

14. The non-transitory computer readable storage medium of claim 9, wherein conducting experiments includes:
identifying, for each identified service, one or more resources or network connections;
retrieving a template that inserts a plurality of faults into a resource or network connection; and
creating an experiment based on retrieve template, wherein each experiment inserts a plurality of faults in one or more of the one or more services, the plurality of faults selected based on a received user input.

15. A system for automatically generating resiliency tests, comprising:
one or more servers, wherein each server includes a memory and a processor; and
one or more modules stored in the memory and executed by at least one of the one or more processors to automatically identifying one or more services operating on a plurality of machines, wherein identifying includes, installing agents at the plurality of the machines, intercepting, by each agent, traffic transmitted to each of the plurality of machines and from each of the one plurality of machines with respect to one or more resources, generating traffic data that includes one or more resources located remote from the plurality of machines and engaged in traffic with one or more of the plurality of machines, transmitting generated traffic data to an application by each agent, and identifying the one or more services by the application based on the traffic data received from the agents, automatically creating fault targets based on the identified one or more services, automatically conducting experiments on the one or more services using the created fault targets, and generating a resilience score based on the experiments.

16. The system of claim 15, wherein creating fault targets includes identifying, for each identified service, one or more resources or network connections, and creating a fault for each resource and network connection.

17. The system of claim 15, wherein conducting experiments includes creating an experiment to insert a fault for one or more resources and one or more network connection associated with each of the one or more services.

18. The system of claim 15, wherein conducting experiments includes identifying, for each identified service, one or more resources or network connections; and receiving input from a user regarding faults to insert in the one or more services, and creating an experiment based on the user input, wherein each experiment inserts two faults in one or more of the one or more services, the two faults selected based on the received user input.

19. The system of claim 15, wherein conducting experiments includes identifying, for each identified service, one or more resources or network connections, retrieving a template that inserts a plurality of faults into a resource or network connection, and creating an experiment based on retrieve template, wherein each experiment inserts a plurality of faults in one or more of the one or more services, the plurality of faults selected based on a received user input.

* * * * *